United States Patent [19]

Sears

[11] 4,135,548

[45] Jan. 23, 1979

[54] LIQUID NITROGEN LEVEL CONTROLLER

[75] Inventor: Daniel Sears, San Antonio, Tex.

[73] Assignee: The United States of America as represented by the Secretary of the Air Force, Washington, D.C.

[21] Appl. No.: 823,562

[22] Filed: Aug. 11, 1977

[51] Int. Cl.² .................... F16K 21/18; F17C 13/02; G01F 23/24

[52] U.S. Cl. ................................. 137/392; 73/304R; 62/49; 340/618; 222/64

[58] Field of Search ...................... 137/392; 62/45, 49, 62/55; 417/7; 235/92 FL; 73/304 R; 340/618, 620; 222/64, 65

[56] References Cited

U.S. PATENT DOCUMENTS

| | | | |
|---|---|---|---|
| 3,291,149 | 12/1966 | Atkins et al. | 137/392 |
| 3,509,825 | 5/1970 | Sorenson | 137/392 |
| 3,545,482 | 12/1970 | Paull | 137/392 |
| 3,741,683 | 6/1973 | McTamaney et al. | 137/392 |
| 3,757,317 | 9/1973 | Kahn et al. | 137/392 |
| 4,059,424 | 11/1977 | Bentz | 62/49 |

OTHER PUBLICATIONS

*Electronic Circuit Manual,* McGraw Hill, 1971.
*Guidebook of Electronic Circuits,* McGraw Hill, 1974.

*Primary Examiner*—Martin P. Schwadron
*Assistant Examiner*—A. Michael Chambers
*Attorney, Agent, or Firm*—Joseph E. Rusz; Robert Kern Duncan

[57] ABSTRACT

The liquid nitrogen level in a flask is controlled by the degree of immersion of two sensing coils of copper wire in the liquid nitrogen activating a solid state switching circuit which controls a liquid nitrogen inlet flow valve. Manual override and sensor fault indication is provided.

1 Claim, 4 Drawing Figures

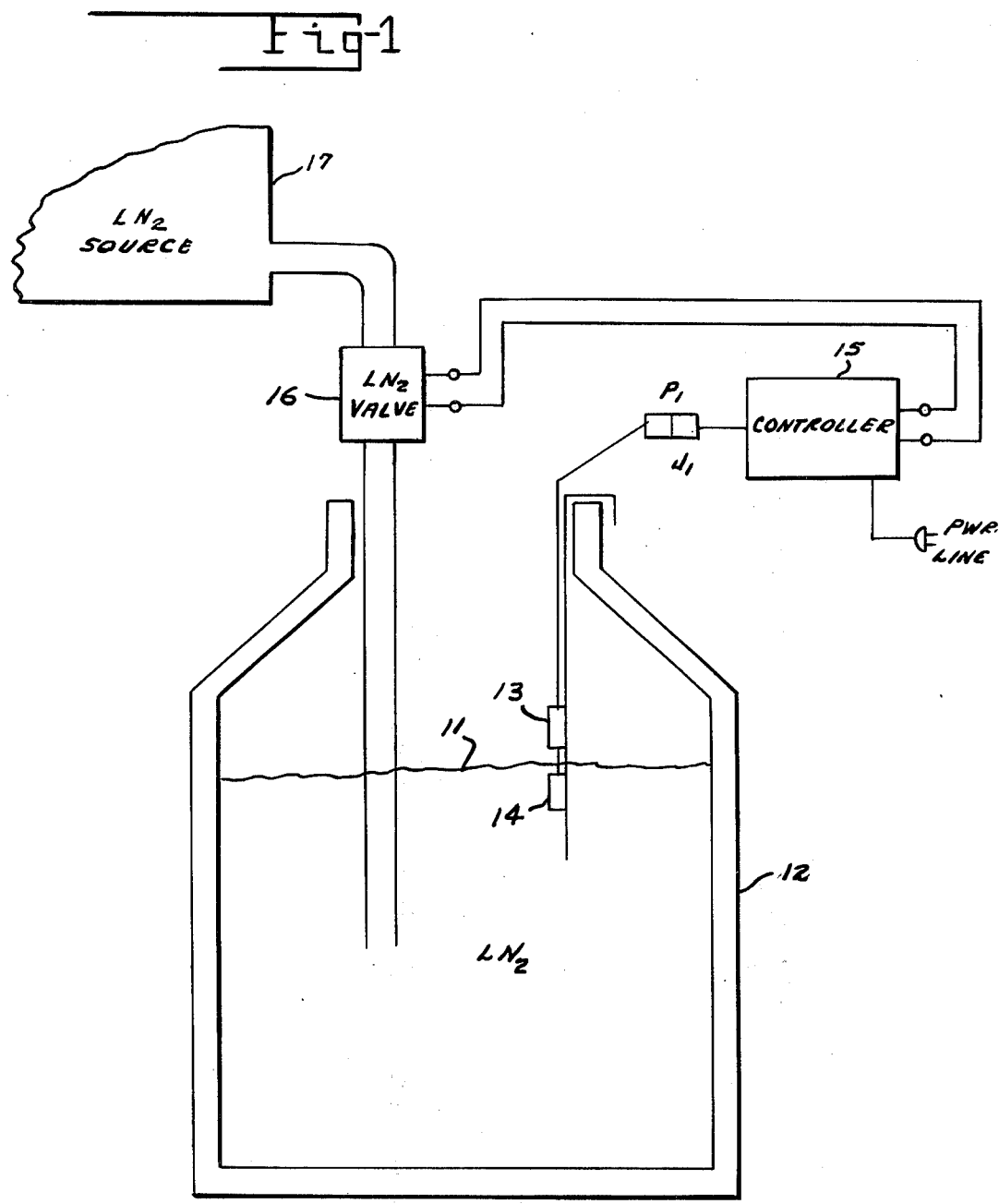

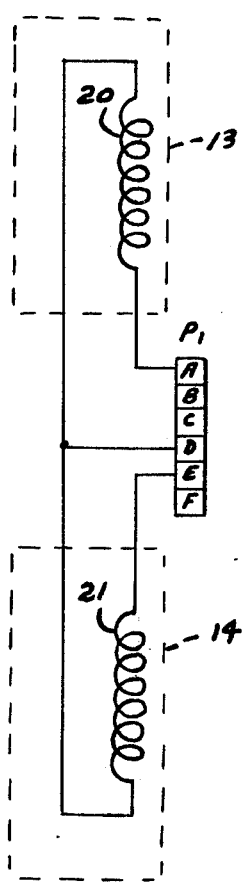

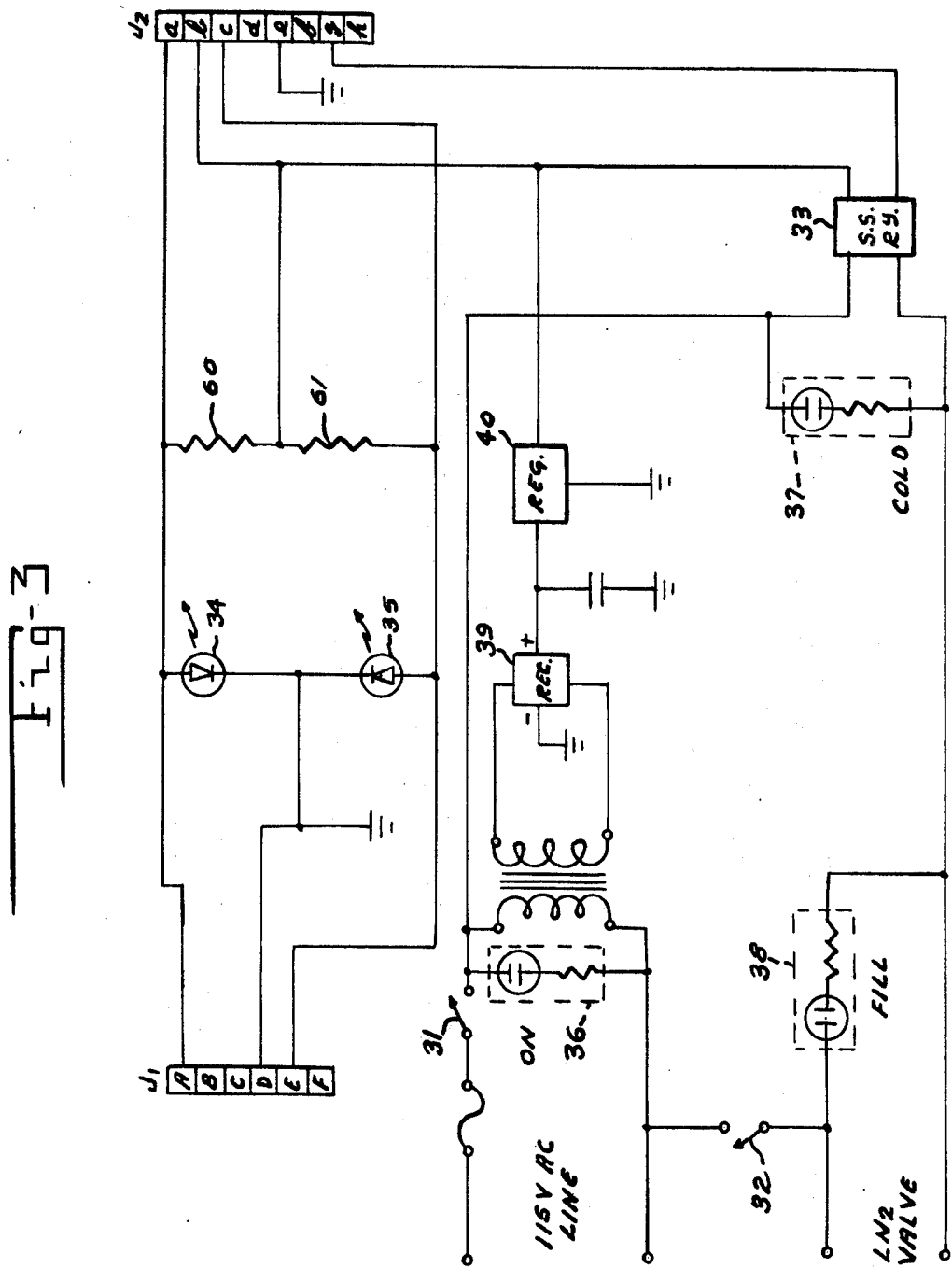

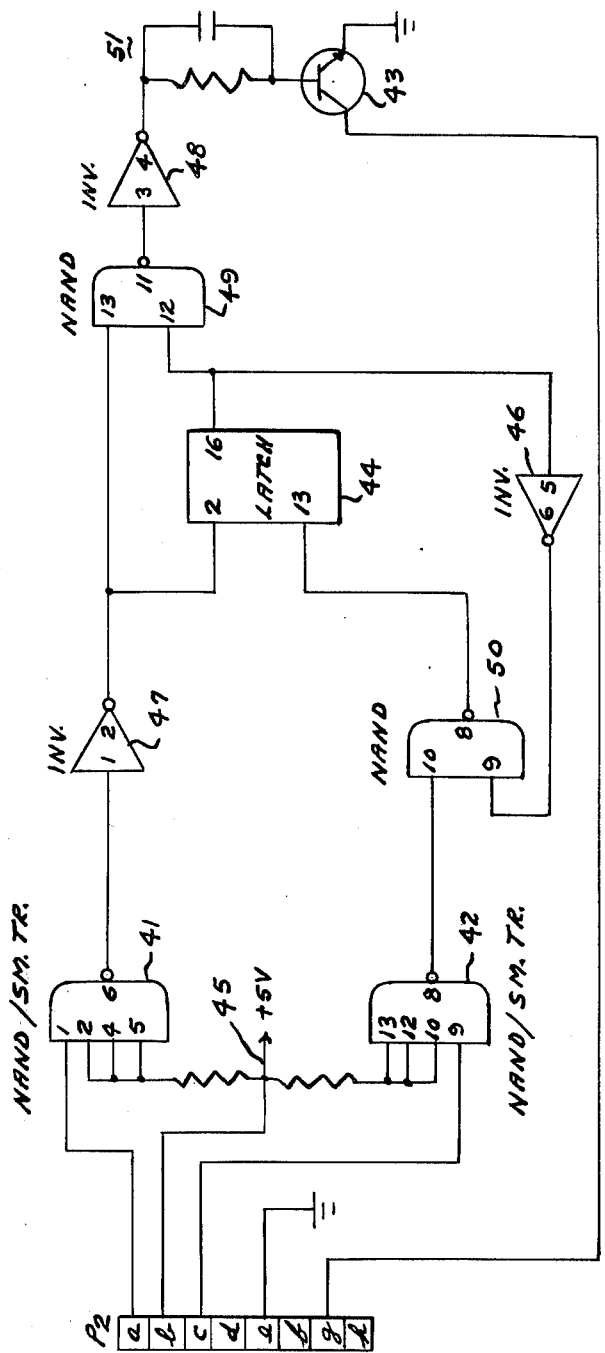

LIQUID NITROGEN LEVEL CONTROLLER

RIGHTS OF THE GOVERNMENT

The invention described herein may be manufactured and used by or for the Government of the United States for all governmental purposes without the payment of any royalty.

BACKGROUND OF THE INVENTION

The field of the invention is in the liquid level sensing art.

The level of the liquid nitrogen in cryogenic sampling systems which are used to measure the amount of gas vapors in the atmosphere such as a jet and other fuel storage facilities is frequently quite critical. Prior art devices have generally been quite sensitive to variations in the input line voltage with resulting erratic operation. They generally use electromechanical relays, and the environment in which the equipment is used is generally not condusive to very long life of the metallic contacts. Many of the prior art devices require elaborate adjustments during operation and cannot be turned off during a cycle of operation without affecting future operation. The following U.S. patents are concerned with liquid level sensing and control and may be of interest in developing the background of the present invention: Thiele, No. 3,222,578; Chaney, No. 3,262,280; Thiele, No. 3,325,135; Rahn et al, No. 3,757,317; Byers et al, No. 3,797,514; Kachuk et al, No. 3,922,564; and Riedel et al, No. 3,938,347.

SUMMARY OF THE INVENTION

A liquid nitrogen level controller is disclosed that is light weight, compact, and completely solid state. It requires no adjustments other than the initial positioning of the level sensors, it is unaffected by relatively large variations in input line voltage, and it can be turned off and on any time during its cycle without affecting its operation. A light emitting diode fault indicator monitors each sensor for open circuits, and a manual override cut-off switch provides shut-off control in the event of circuit failure.

BRIEF DESCRIPTION OF THE DRAWING

FIG. 1 is a block-schematic diagram of a liquid nitrogen level control system;

FIG. 2 is a schematic diagram of a typical two-copper-coil liquid nitrogen sensor;

FIG. 3 is a schematic diagram of an embodiment of a typical power and indicator circuitry; and FIG. 4 is a schematic diagram of a typical logic board circuit.

DESCRIPTION OF THE PREFERRED EMBODIMENT

As illustrated in FIG. 1, typically the invention provides automatic control of the liquid nitrogen level 11, in a dewar flask 12, which is a part of a portable cryogenic sampling system for trace gas analyses. The upper and lower limits of the liquid nitrogen level 11 are determined by the positions of a pair of conventional, commercially available liquid nitrogen sensors 13 and 14. These sensors, through controller 15, open and close the conventional liquid nitrogen valve 16 admitting liquid nitrogen to the flask 12 from the source 17. A typical conventional sensor assembly consists of two coils of copper wire as schematically diagrammed in FIG. 2. Each coil 20 and 21 has a nominal resistance of 16 ohms at 25° C. The coils are suspended vertically in the flask providing an upper level sensor 13 and a lower level sensor 14.

The initial filling starts, with the flask empty and both sensors at normal ambient temperature. Referring to FIGS. 3 and 4 along with FIGS. 1 and 2, when the power and $LN_2$ cut-off switches 31 and 32, respectively, are turned on, a high logic level voltage appears at the inputs to both Schmitt triggers 41 and 42. Through the logic circuit this turns on transistor 43, which activates the solid state relay 33 and the $LN_2$ valve 16, allowing $LN_2$ to flow from the reservoir source 17 into the dewar flask 12. When both sensors reach the $LN_2$ temperature ($-196°$ C.), a low logic level to the Schmitt triggers turns transistor 43 off which in turn, through solid state relay 33, shuts the $LN_2$ valve. When the $LN_2$ boils off and exposes the upper level sensor 13, a high logic level at pin one of integrated circuit 41 appears, but the transistor 43 is prevented from turning on by the conventional latch circuit 44. When the lower sensor 14 is exposed by the boil-off of $LN_2$, the resulting high logic level of pin 9 of integrated circuit 42 causes the integrated circuit 44 to unlatch, allowing transistor 43 to turn on and reinitiate the filling cycle. Thus, the $LN_2$ level fluctuates over the determined amount from approximately the bottom of the lower sensor coil to the top of the upper sensor coil, i.e., the $LN_2$ valve is opened when the $LN_2$ level is below the lower sensor and it is closed when the $LN_2$ level rises above the upper sensor. The regulated +5 volt line 45 supplies the power to the integrated circuits in the logic board. Typical and suitable elements for integrated circuits 41 and 42 are type SN 7413 dual NAND Schmitt triggers; for the inverters, a type SN 7404 Hex inverter; for the NAND gates 49 and 50, a type SN 7400 quad 2 I/P NAND gate; for the latch 44 a type SN 7475 4-Bit latch; and for the transistor 43, a type 2N2369. The RC smoothing and filtering circuit 51 (typically, 100 ohm and 470 pf) prevents any "hunting" type action due to small rapid variations in the $LN_2$ level and provides positive turn-on and turn-off of the $LN_2$ valve.

The two light emitting diodes (LED's) 34 and 35 (FIG. 3), function as sensor fault indicators. The LED's will light up if either or both sensors have an open circuit or are disconnected. A shorted sensor will automatically prevent the operation of the $LN_2$ valve. A separate $LN_2$ valve switch 32 provides for manual cut-off of the $LN_2$ flow anytime during operation of the controller. Conventional neon indicators 36, 37, and 38 indicate when on that the equipment is energized; that the dewar is at the full level, i.e., the controller has shut the $LN_2$ valve; and that the $LN_2$ valve is open and the dewar is filling, respectively. Conventional rectifier 39 and regulator 40 provide a low voltage, typically approximately five volts, for equipment operation that is relatively immune to the 115 volt ac line fluctuations. Resistors 60 and 61 across the balanced input circuit should be substantially identical. Seventeen ohm, 3 watt, wire round, 1% resistors have been found to be suitable for the circuit embodiment being described. A suitable solid state relay 33 is the Sigma type 226-R-1-5A1.

I claim:

1. A liquid nitrogen level controller for maintaining the level of $LN_2$ in a flask within a determined range comprising:

a. a source of $LN_2$;

b. means including a LN$_2$ valve for conducting LN$_2$ from the said source to the said flask;
c. a first LN$_2$ sensor;
d. a second LN$_2$ sensor;
e. means for positioning the said first and second LN$_2$ sensors in a substantially vertical upper and lower relationship, respectively, within the said flask;
f. means including a dual NAND Schmitt trigger circuit and a four-bit latch circuit cooperating with the said first and second sensors and the LN$_2$ valve for opening the said LN$_2$ valve when the said LN$_2$ level in the flask is below the said lower sensor and closing the said LN$_2$ valve when the LN$_2$ level is above the said upper sensor.